US011890896B2

(12) United States Patent
Zhang et al.

(10) Patent No.: US 11,890,896 B2
(45) Date of Patent: Feb. 6, 2024

(54) PREPARATION METHOD OF ITACONATE-BUTADIENE BIO-BASED ENGINEERING RUBBER

(71) Applicants: Beijing University of Chemical Technology, Beijing (CN); The Goodyear Tire & Rubber Company, Akron, OH (US)

(72) Inventors: Liqun Zhang, Beijing (CN); Xinxin Zhou, Beijing (CN); Runguo Wang, Beijing (CN); Weiwei Lei, Beijing (CN); He Qiao, Beijing (CN); Kuo-chih Hua, Akron, OH (US); Joseph Kulig, Akron, OH (US); Surendra K Chawla, Akron, OH (US)

(73) Assignees: BEIJING UNIVERSITY OF CHEMICAL TECHNOLOGY, Beijing (CN); THE GOODYEAR TIRE & RUBBER COMPANY, Akron, OH (US)

( * ) Notice: Subject to any disclaimer, the term of this patent is extended or adjusted under 35 U.S.C. 154(b) by 549 days.

(21) Appl. No.: 15/736,198

(22) PCT Filed: Jun. 2, 2016

(86) PCT No.: PCT/CN2016/084508
§ 371 (c)(1),
(2) Date: Mar. 27, 2018

(87) PCT Pub. No.: WO2016/202175
PCT Pub. Date: Dec. 22, 2016

(65) Prior Publication Data
US 2018/0250984 A1    Sep. 6, 2018

(30) Foreign Application Priority Data
Jun. 15, 2015 (CN) .......................... 201510331148.8

(51) Int. Cl.
*B60C 1/00* (2006.01)
*C08F 2/22* (2006.01)
(Continued)

(52) U.S. Cl.
CPC .............. *B60C 1/0016* (2013.01); *B60C 1/00* (2013.01); *B65G 15/32* (2013.01); *C08F 2/22* (2013.01);
(Continued)

(58) Field of Classification Search
CPC ......... B60C 1/0016; B60C 1/00; B65G 15/32; C08F 2/22; C08F 222/02; C08F 222/14;
(Continued)

(56) References Cited

U.S. PATENT DOCUMENTS

2016/0288570 A1* 10/2016 Fujisawa ............... B60C 1/0016

FOREIGN PATENT DOCUMENTS

JP    WO-2015075971 A1 *  3/2017  ............ C08F 222/14

* cited by examiner

*Primary Examiner* — David T Karst
(74) *Attorney, Agent, or Firm* — Leonid Kisselev

(57) ABSTRACT

A preparation method of itaconate-butadiene bio-based engineering rubber belongs to the bio-based engineering rubber area. The bio-based engineering rubber of the present disclosure is formed through chemical crosslinking of copolymers, which are formed by polymerization of itaconate and butadiene emulsion. The number average molecular weight of the itaconate-butadiene copolymer is about 53000-1640000, and weight-average molecular weight is about 110000-2892000. Itaconate-butadiene copolymers are formed by polymerization of itaconate and butadiene emulsion, then and chemical crosslinking of the copolymer is performed to form bio-based engineering rubber using a traditional sulfur vulcanizing system. The bio-based engineering rubber has high molecular weights as well as lower (Continued)

glass-transition temperatures and can be vulcanized using the traditional sulfur vulcanizing system. The bio-based engineering rubber of the present disclosure has same physic-mechanical property as well as processability as compared to rubber prepared using conventional techniques and may be used for manufacturing tire treads and conveyor belts.

10 Claims, 3 Drawing Sheets

(51) Int. Cl.
*C08F 236/06* (2006.01)
*C08F 222/14* (2006.01)
*C08F 222/16* (2006.01)
*B65G 15/32* (2006.01)
*C08F 222/02* (2006.01)
*C08F 222/12* (2006.01)
*C08F 2/26* (2006.01)
*C08F 222/04* (2006.01)

(52) U.S. Cl.
CPC .......... *C08F 222/02* (2013.01); *C08F 222/04* (2013.01); *C08F 222/16* (2013.01); *C08F 236/06* (2013.01); *C08F 2500/01* (2013.01); *C08F 2500/04* (2013.01)

(58) Field of Classification Search
CPC .. C08F 222/16; C08F 236/06; C08F 2500/01; C08F 2500/04; C08F 222/12; C08F 2/26
USPC ........................................................ 523/149
See application file for complete search history.

PREPARATION METHOD OF ITACONATE-BUTADIENE BIO-BASED ENGINEERING RUBBER

CROSS-REFERENCE TO RELATED APPLICATION

This application is a national stage application of International application number PCT/CN2016/084508, filed Jun. 2, 2016, titled "A preparation method of itaconate-butadiene bio-based engineering rubber," which claims the priority benefit of Chinese Patent Application No. 201510331148.8, filed on Jun. 15, 2015, which is hereby incorporated by reference in its entirety.

TECHNICAL FIELD

The present disclosure involves an itaconate-butadiene bio-based engineering rubber through emulsion polymerization under low-temperature, which is a redox initiation system.

BACKGROUND

Since people are concerned about the depletion of fossil resources and environmental pollution, they want to take advantage of low-carbon, environmental, and renewable resources. Rubber is widely used in national defense and people's livelihood due to its' unique high elasticity. Rubber is a valuable strategic resource. However, the rubber synthetic industry relies on non-renewable fossil energy for a long time. At the same time, synthetic costs of rubber are higher and higher since the acceleration consumption of nonrenewable fossil energy increases the damage to the environment. The development of rubber industry is restricted. Therefore, uses of low-carbon, environmental, and renewable resources and independence of non-renewable fossil energy are significant for environment protection and the rubber industry.

Development of bio-based chemicals draws more and more attention from the world, uses of bio-based chemicals and synthesis rubber have a broader prospect. Under this precondition, the Applicant disclosed the concept of bio-based engineering elastomer and pointed out the characters of bio-based engineering elastomer as flow: (1) major renewable raw materials; (2) better environment stability; (3) capability of being processed using traditional rubber techniques; and (4) better mechanical property to satisfy the engineering application. The Applicant disclosed an unsaturated aliphatic polyester bio-based engineering rubber which is synthesized through condensation of bio-based chemicals disclosed in Chinese Patent Application "polyester bio-based engineering rubber and its preparation method" (ZL 200910076032.9). This kind of polyester bio-based engineering rubber is synthesized through direct polycondensation of diglycol and diacid, number average molecular weight is about 19800~55000, and its weight-average molecular weight is about 88610~222500, the chemical crosslinking is implemented by using peroxide, enhancers also can be added during crosslinking. The traditional rubber technics can be used for molding.

In Chinese Patent Application "itaconate-isoprene bio-based engineering rubber and its preparation method" (ZL201110440400.0), the Applicant disclosed a bio-based engineering elastomer and its preparation method through emulsion polymerization of bio-based chemicals itaconate and isoprene. Free radical is generated through thermal cracking of initiator, polymerization of itaconate and isoprene is finished under high temperature and pressure, the number average molecular weight of obtained bio-based engineering rubber is about 52500~502563, and its weight-average molecular weight is about 135230~1503263. The mechanical property is relatively low, and cannot be used for such as tires and conveyor belts).

In Chinese Patent Application "itaconate-isoprene bio-based engineering rubber preparation by low-temperature emulsion polymerization" (ZL201110440385.X), the Applicant disclosed a preparation method of itaconate-isoprene bio-based engineering rubber under low temperature. Free radical is generated through redox process. Polyreaction is triggered by a normal pressure and temperature, energy consumption and the operative difficulty are decreased. The number average molecular weight of obtained bio-based engineering rubber is about 145200~705678, and its weight-average molecular weight is about 290400~2540440.

Butadiene is a kind of alkadienes monomer with conjugated structure. Compared with isoprene, no pendant group contains in butadiene structure, and it has lower influenced by steric effects during polymerization. The addition reaction is easier to occur to generate high molar mass polymers, and this polymer has lower glass transition temperature. Moreover, butadiene is cheaper than isoprene so that the costs are reduced. Global Bioenergies produced biological sources butadiene through direct fermentation successfully in Nov. 28, 2014. It is the first time that butadiene was produced through a completely biological process without any chemical steps. It is a great breakthrough for bio-based butadiene production.

The bio-based monomer is used as raw materials to react with butadiene to prepare a polymer with high molecular weights, a low glass transition temperature, and a better mechanical property through emulsion copolymerization, which is triggered by the free radical. Further, traditional rubber processing techniques can be used on itaconate-butadiene bio-based engineering rubber. No such finding has been reported yet.

Dynamic mechanical analysis (DMTA) is an important method to study structure and property of a polymer. For example, the corresponding relationship between polymer loss factor (tan δ) and the experimental temperature is obtained, and tan δ is an important parameter to judge the polymer operating characteristic. As for the composite material of tire rubber, at 0° C., the larger the tan δ is, the better wet-skid resistance and the produced tire have, and it is safer; at 60° C., the smaller the tan δ is, the lower rolling resistance the produced tire have, and it is more energy-saving. Another target of the present disclosure is to adjust the viscoelasticity of itaconate-butadiene bio-based engineering rubber through changing the feeding ratio of itaconate and butadiene to get the best dynamic mechanical property, which means that it is higher at 0° C. and lower at 60° C. The high-performance tire produced by itaconate-butadiene bio-based engineering rubber with the best dynamic mechanical property has not been reported yet.

SUMMARY

The present disclosure discloses a preparation method of itaconate-butadiene bio-based engineering rubber with high molecular weight and low glass transition temperature. The bio-based engineering rubber can be vulcanized through the sulfur vulcanizing system and has the same physical, mechanical and processing properties as rubber prepared using conventional techniques.

The present disclosure discloses a preparation method of itaconate-butadiene bio-based engineering rubber, the bio-based engineering rubber formed through chemical crosslinking of a copolymer which is formed by emulsion polymerization of itaconate and butadiene, number average molecular weight of the itaconate-butadiene copolymer is about 53000-1640000, weight-average molecular weight is about 110000-2892000.

At first, itaconate monomer and butadiene are used for preparing itaconate-butadiene copolymer through emulsion polymerization; then, bio-based engineering rubber is produced through chemical crosslinking of the itaconate-butadiene copolymer. Chemical crosslinking process can be realized by adding traditional sulfur vulcanizing system; the specific steps are described as below:

A: emulsion polymerization of itaconate and butadiene: itaconate, emulsifier, electrolyte, activator and deionized water is added to polymerization reactor, close the polymerization reactor, first, proceed vacuum-pumping, then fill with nitrogen, repeat it for 1-5 times; after last nitrogen is filled in, butadiene, deoxidant, and initiator is added in polymerization reactor, reacting 5-15 hours in polymerization reactor under 1-20° C., 0.1-5 Mpa. The terminator is added to terminate the reaction; mass ratio of itaconate, butadiene, emulsifier, electrolyte, activator, deoxidant and initiator, terminator and deionized water is 100:1-100:1-10: 0.1-5:0.01-5:0.1-5:0.01-5:1-10:100-1000. Itaconate-butadiene copolymer gum is obtained after demulsification of the emulsion; number average molecular weight of gum is about 53000-1640000, and weight-average molecular weight is about 110000-2892000.

The molecular formula of itaconate mentioned above is:

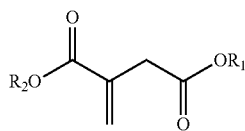

(1)

Wherein $R_1$ and $R_2$ represent H or $C_{1-10}$ alkyl, $R_1$ $R_2$ can be same or different, n-butyl, n-amyl and isoamyl are preferred.

The above-mentioned emulsifier is one of disproportionate sodium abietate, disproportionate potassium rosinate, sodium aliphatate soap, potassium aliphatate soap, sodium dodecyl sulfate, sulfate sodium dodecyl benzene sulfonate and sodium dodecyl sulfonate or a mixture of them.

The electrolyte mentioned above is one of potassium chloride (KCl), potassium phosphate ($K_3PO_4$), EDTA, TAOM-L, phosphate ($H_3PO_4$) and potassium hydroxide (KOH) or a mixture of them.

The activator mentioned above is a mixture of sodium formaldehyde sulfoxylate and EDTA ferric (EDTA-Fe) or a mixture of sodium formaldehyde sulfoxylate and EDTA-Fe·Na.

The initiator mentioned above is hydrogen peroxide p-menthane, tert-butyl hydroperoxide, and cumene hydroperoxide.

The deoxidant mentioned above is sodium hydrosulfite.

The terminator mentioned above is sodium N, N-dimethyl dithiocarbamate, sodium diethyldithiocarbamate, hydroxylamine or sodium polysulfide.

Itaconate and butadiene can be combined in any ratio, preferred mass ratio of itaconate and butadiene monomer is 100:10-60.

Demulsifier mentioned above used in demulsification and drying process is a hydrochloric acid solution with 0.1~0.5 mol/L hydrogen ion concentration, 1 wt %~5 wt % calcium chloride water, absolute methanol or ethanol absolute.

B: vulcanization process: Take sulfur as a cross-linking agent; the traditional sulfur vulcanizing system is used to prepare itaconate-butadiene bio-based engineering rubber through mold cure under 140-160° C.

The preparation method of rubber and vulcanization system mentioned above is traditional rubber processing technics, its' using principle is well-known.

Vulcanization system mentioned above-comprising vulcanization activator (such as zinc oxide and stearic acid), vulcanization accelerator (such as accelerator M, accelerator CZ, and accelerator D) and vulcanizer (such as Sulphur).

Silica or carbon black can be used as an enhancer to improve the strength. Silane coupling agent Si69 can be used to improve the compound effect when silica is used as an enhancer.

Beneficial effects of the present disclosure are: using redox to initiate system, under 1-20° C., a kind of itaconate-butadiene bio-based engineering rubber is produced through emulsion polymerization. Its' number-average molar mass will reach more than a million, its' molecular weight is narrow distributed, and traditional rubber processing technics can be used to process it. Through adding filler, mechanical properties of the rubber can be improved effectively; it satisfies the high mechanical property requirements of tire tread and conveyor. The first batch of itaconate-butadiene bio-based engineering rubber tire is produced successfully, after testing, this kind of tire is a high performance green tire with low rolling resistance and high wet—skid resistance.

DETAILED DESCRIPTION OF THE PREFERRED EMBODIMENTS

Figure 1:
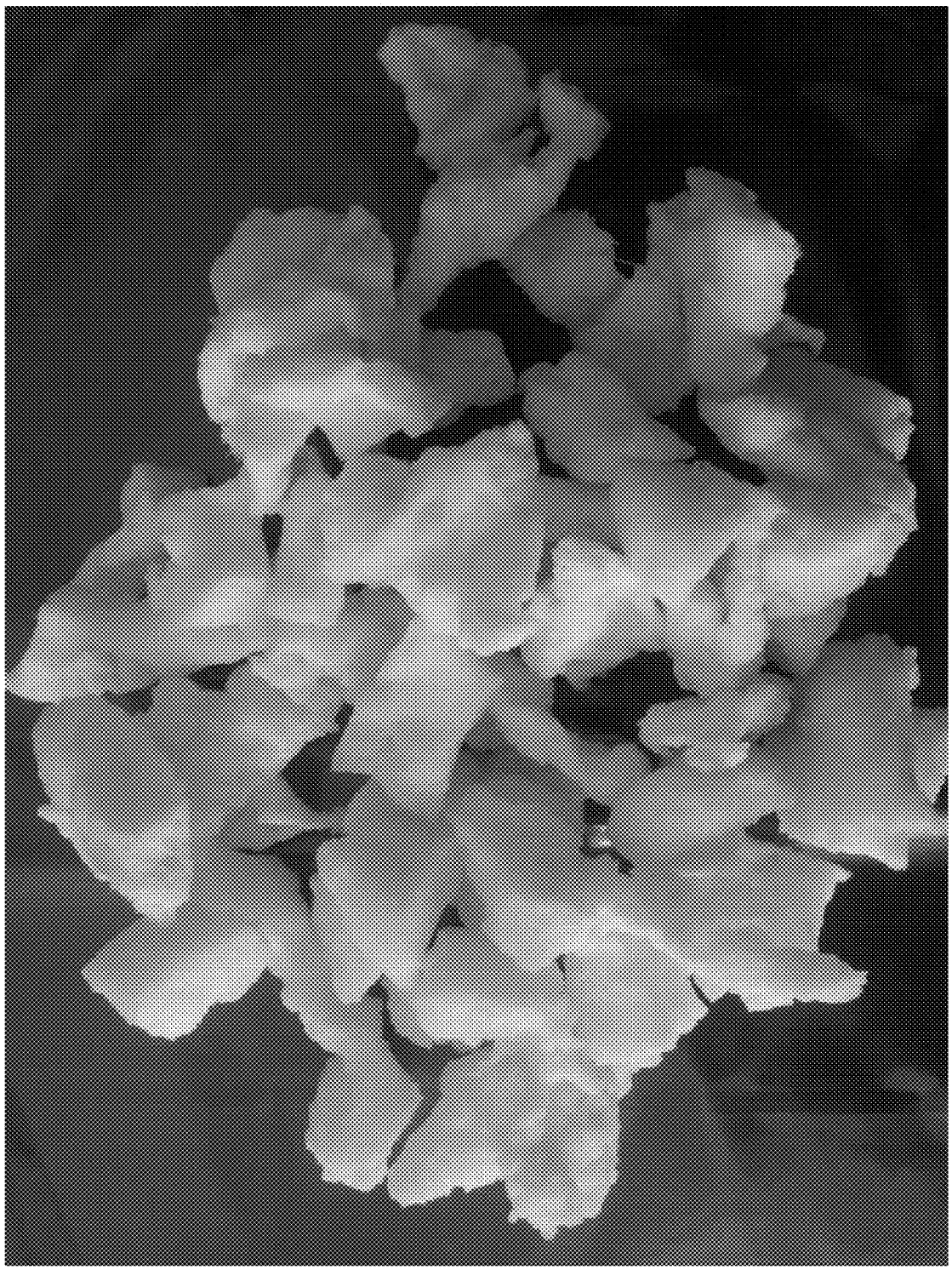
FIG. 1 is a photo itaconate-butadiene bio-based engineering rubber produced by embodiments 4.
Figure 2:
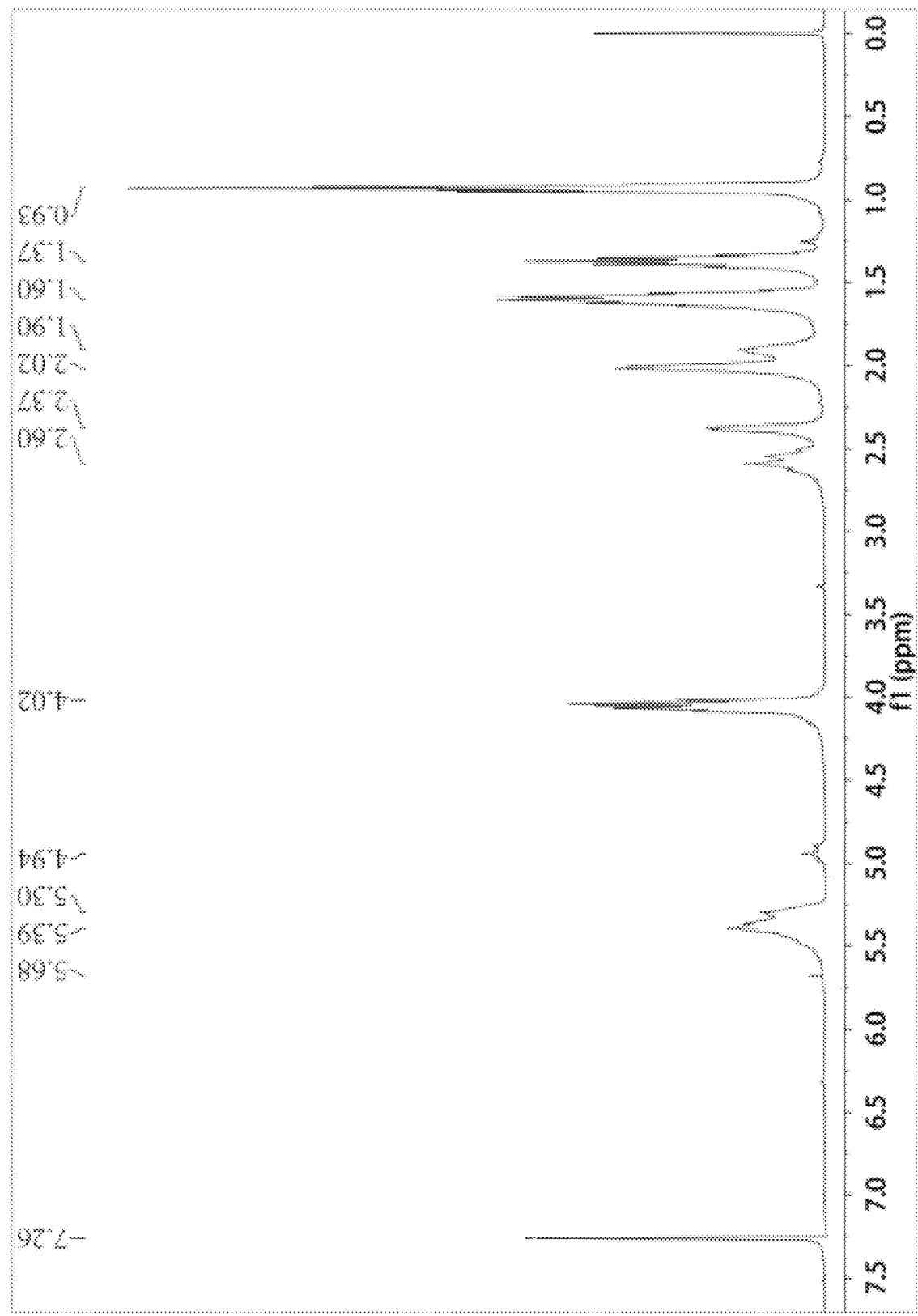
FIG. 2 is a $^1$H-NMR diagram of itaconate-butadiene bio-based engineering rubber produced by embodiments 4, peak at chemical shift 4.94-5.68 ppm indicates that there is double bond exist in itaconate-butadiene bio-based engineering rubber, which provides crosslink points in a later crosslink process.
Figure 3:
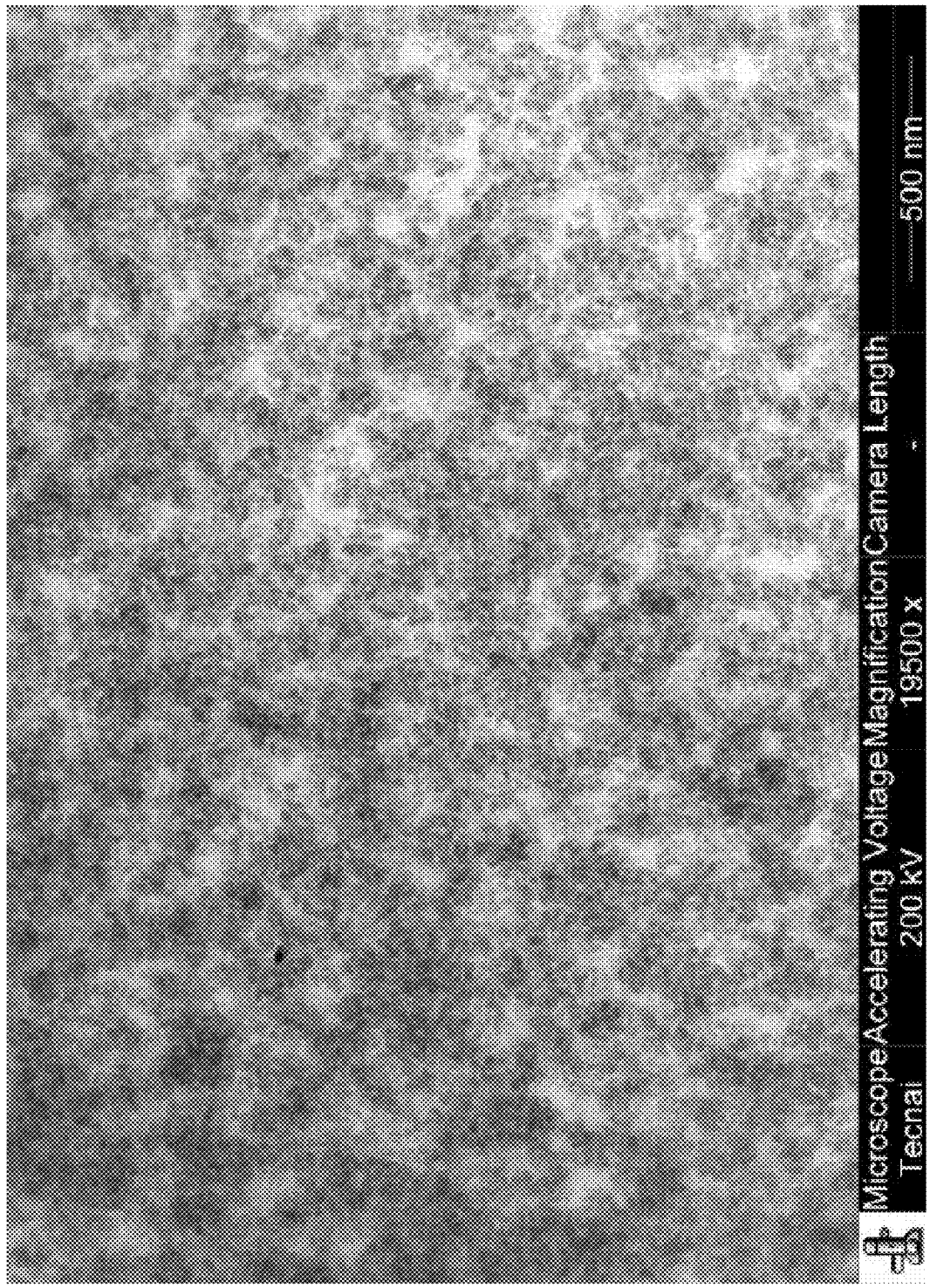
FIG. 3 is a TEM photo of silica-enhanced itaconate-butadiene bio-based engineering rubber produced by embodiments 11 and shows that filler has good dispersion effect in itaconate-butadiene bio-based engineering rubber.

All materials used in embodiments and comparisons below are sold on the market. Materials used in polymerization process is an analytical reagent, materials in mixing process are chemically pure. Loss factor (tan δ) of itaconate-butadiene bio-based engineering rubber in embodiments and rubber compound materials in comparisons is tested through dynamic mechanical analyzer under −80-100° C., 10 Hz, 3° C./min heating rate and 0.1% dynamic stress stretch. The size of test wafer is 20 mm length×10 mm width×1 mm thickness.

Embodiment 1

Various operations were performed to add 500 g deionized water, 150 g monomethyl itaconate, 3 g soap of potassium aliphatate, 4 g soap of sodium aliphatate, 2 g $H_3PO_4$, 0.02 g EDTA, 0.25 g TAOM-L, 0.01 g EDTA-Fe and 0.05 g sodium formaldehyde sulfoxylate into a 1 L polymerization device, seal the device, vacuumize and fill with nitrogen. Then, 50 g butadiene, 0.02 g sodium dithionite, and 0.03 g hydrogen peroxide p-menthane are added to the device, react 15 hours under 1° C., 0.1 Mpa, add 1 g hydroxylamine to end the reaction to obtain monomethyl itaconate-butadiene bio-based engineering rubber latex. It is poured into 0.1 mol/L hydrochloric acid to finish emulsion breaking and drying process, then dimethyl itaconate-butadiene bio-based engineering raw rubber is obtained.

Further operations include taking 100 g monomethyl itaconate-butadiene bio-based engineering raw rubber mentioned above to mix with 5 g zinc oxide, 2 g stearic acid, 1 g sulphur, 0.7 g accelerator M, 1 g accelerator CZ, 50 g silica and 5 g Si69 homogeneously on two roll mill to get rubber compound. The mold cure is performed under 140° C. to get dimethyl itaconate-butadiene bio-based engineering rubber.

Embodiment 2

Various operations were performed to add 500 g deionized water, 160 g monoethyl itaconate, 5 g soap of potassium aliphatate, 5 g disproportionated rosin sodium soap, 0.3 g $K_3PO_4$, 0.15 g KCl, 0.03 g EDTA, 0.25 g TAOM-L, 1 g EDTA-Fe·Na and 4 g sodium formaldehyde sulfoxylate into a 1 L polymerization device; seal the device, vacuumize and fill with nitrogen, continuously operation for 3 times. Then, 40 g butadiene, 0.01 g sodium dithionite, and 0.05 g hydrogen peroxide p-menthane are added to the device, react 10 hours under 5° C., 1 Mpa, add 5 g hydroxylamine to end the reaction to obtain monoethyl itaconate-butadiene bioengineering rubber latex. It is poured into absolute ethyl alcohol to finish emulsion breaking and drying process, then diethyl itaconate-butadiene bio-based engineering raw rubber is obtained.

Further operations include taking 100 g diethyl itaconate-butadiene bio-based engineering raw rubber mentioned above to mix with 5 g zinc oxide, 2 g stearic acid, 1 g sulphur, 0.7 g accelerator M, 1 g accelerator CZ, 40 g silica and 4 g Si69 homogeneously on two roll mill to get rubber compound. The mold cure is performed under 150° C. to get diethyl itaconate-butadiene bio-based engineering rubber.

Embodiment 3

Various operations were performed to add 500 g deionized water, 140 g dibutyl itaconate, 3 g soap of potassium aliphatate, 4 g soap of sodium aliphatate, 0.2 g $H_3PO_4$, 0.12 g KOH, 0.02 g EDTA, 0.25 g TAOM-L, 0.01 g EDTA-Fe and 0.05 g sodium formaldehyde sulfoxylate into a 1 L polymerization device; seal the device, vacuumize and fill with nitrogen, continuously operation for 5 times. Then, 60 g butadiene, 2 g sodium dithionite, and 5 g hydrogen peroxide p-menthane are added to the device, react 8 hours under 5° C., 1 Mpa, add 3 g hydroxylamine to end the reaction to obtain monobutyl itaconate-butadiene bio-based engineering rubber latex. It is poured into 1 wt % calcium chloride solution to finish emulsion breaking and drying process, then dibutyl itaconate-butadiene bio-based engineering raw rubber is obtained.

Further operations include taking 100 g dibutyl itaconate-butadiene bio-based engineering raw rubber mentioned above to mix with 5 g zinc oxide, 2 g stearic acid, 1 g sulphur, 0.7 g accelerator M, 1 g accelerator CZ, 60 g silica and 6 g Si69 homogeneously on two roll mill to get rubber compound. The mold cure is performed under 160° C. to get dibutyl itaconate-butadiene bio-based engineering rubber.

Embodiment 4

Various operations were performed to add 500 g deionized water, 120 g dibutyl itaconate, 3 g soap of potassium aliphatate, 4 g soap of sodium aliphatate, 0.2 g $H_3PO_4$, 0.12 g KOH, 0.02 g EDTA, 0.25 g TAOM-L, 0.02 g EDTA-Fe and 0.05 g sodium formaldehyde sulfoxylate into a 1 L polymerization device; seal the device, vacuumize and fill with nitrogen, continuously operation for 4 time. Then, 80 g butadiene, 0.01 g sodium dithionite, and 0.01 g hydrogen peroxide p-menthane are added to the device, react 9 hours under 5° C., 1 Mpa, add 10 g hydroxylamine to end the reaction to obtain dibutyl itaconate-butadiene bio-based engineering rubber latex. It is poured into 1 wt % calcium chloride solution to finish emulsion breaking and drying process, then dibutyl itaconate-butadiene bio-based engineering raw rubber is obtained.

Further operations include taking 100 g dibutyl itaconate-butadiene bio-based engineering raw rubber mentioned above to mix with 5 g zinc oxide, 2 g stearic acid, 1 g sulphur, 0.7 g accelerator M, 1 g accelerator CZ, 60 g silica and 6 g Si69 homogeneously on two roll mill to get rubber compound. The mold cure is performed under 150° C. to get dibutyl itaconate-butadiene bio-based engineering rubber.

Embodiment 5

Various operations were performed to add 400 g deionized water, 140 g n-amyl itaconate, 5 g disproportionated potassium rosinate, 2 g $H_3PO_4$, 1.2 g KOH, 0.5 g EDTA, 1.3 g TAOM-L, 0.01 g EDTA-Fe·Na and 0.05 g sodium formaldehyde sulfoxylate into a 1 L polymerization device; seal the device, vacuumize and fill with nitrogen, continuously operation for 3 times Then, 60 g butadiene, 0.02 g sodium dithionite, and 0.03 g hydrogen peroxide p-menthane are added to the device, react 10 hours under 5° C., 0.5 Mpa, add 10 g hydroxylamine to end the reaction to obtain di-n-amyl itaconate-butadiene bio-based engineering rubber latex. It is poured into 1 wt % calcium chloride solution to finish emulsion breaking and drying process, then di-n-amyl itaconate-butadiene bio-based engineering raw rubber is obtained.

Further operations include taking 100 g di-n-amyl itaconate-butadiene bio-based engineering raw rubber mentioned above to mix with 5 g zinc oxide, 2 g stearic acid, 1 g sulphur, 0.7 g accelerator M, 1 g accelerator CZ, 80 g silica and 8 g Si69 homogeneously on two roll mill to get rubber compound. The mold cure is performed under 150° C. to get di-n-amyl itaconate-butadiene bio-based engineering rubber.

Embodiment 6

Various operations were performed to add 600 g deionized water, 140 g dibutyl itaconate, 6 g sodium dodecyl sulfate, 0.2 g $K_3PO_4$, 0.4 g KCl, 0.02 g EDTA, 0.2 g TAOM-L, 0.02 g EDTA-Fe and 0.05 g sodium formaldehyde sulfoxylate into a 1 L polymerization device; seal the device, vacuumize and fill with nitrogen, continuously operation for four times. Then, 60 g butadiene, 0.02 g sodium dithionite, and 0.03 g hydrogen peroxide p-menthane are added to the device, react 10 hours under 5° C., 2 Mpa, add 1 g sodium N, N-dimethyl dithiocarbamate to end the reaction to obtain monobutyl itaconate-butadiene bio-based engineering rubber latex. It is poured into 5 wt % calcium chloride solution to finish emulsion breaking and drying process, then dibutyl itaconate-butadiene bio-based engineering raw rubber is obtained.

Further operations include taking 100 g dibutyl itaconate-butadiene bio-based engineering raw rubber mentioned above to mix with 5 g zinc oxide, 2 g stearic acid, 1 g sulphur, 0.7 g accelerator M, 1 g accelerator CZ, 60 g silica and 6 g Si69 homogeneously on two roll mill to get rubber compound. The mold cure is performed under 150° C. to get dibutyl itaconate-butadiene bio-based engineering rubber.

Embodiment 7

Various operations were performed to add 500 g deionized water, 150 g isopentyl itaconate, 3 g soap of potassium aliphatate, 4 g soap of sodium aliphatate, 0.2 g $H_3PO_4$, 0.12 g KOH, 0.02 g EDTA, 0.25 g TAOM-L, 0.01 g EDTA-Fe and 0.05 g sodium formaldehyde sulfoxylate into a 1 L polymerization device; seal the device, vacuumize and fill with nitrogen, continuously operation for 3 times. Then, 50 g butadiene, 0.02 g sodium dithionite, and 0.03 g tert-butyl hydroperoxide are added to the device, react 5 hours under 10° C., 3 Mpa, add 7 g hydroxylamine to end the reaction to obtain diisopentyl itaconate-butadiene bio-based engineering rubber latex. It is poured into ethanol to finish emulsion breaking and drying process, then diisopentyl itaconate-butadiene bio-based engineering raw rubber is obtained.

Further operations include taking 100 g diisopentyl itaconate-butadiene bio-based engineering raw rubber mentioned above to mix with 5 g zinc oxide, 2 g stearic acid, 1 g sulphur, 0.7 g accelerator M, 1 g accelerator CZ, 60 g carbon black N330 homogeneously on two roll mill to get rubber compound. The mold cure is performed under 150° C. to get diisopentyl itaconate-butadiene bio-based engineering rubber.

Embodiment 8

Various operations were performed to add 500 g deionized water, 160 g dibutyl itaconate, 2 g sodium dodecyl benzene sulfonate, 0.2 g $K_3PO_4$, 0.5 g KCl, 0.02 g EDTA, 0.25 g TAOM-L, 0.01 g EDTA-Fe and 0.05 g sodium formaldehyde sulfoxylate into a 1 L polymerization device; seal the device, vacuolize and fill with nitrogen, continuously operation for 2 times. Then, 40 g butadiene, 0.02 g sodium dithionite, and 0.03 g cumene hydroperoxide are added to the device, react 7 hours under 20° C., 5 Mpa, add 1 g hydroxylamine to end the reaction to obtain dibutyl itaconate-butadiene bio-based engineering rubber latex. It is poured into 2 wt % calcium chloride solution to finish emulsion breaking and drying process, then dibutyl itaconate-butadiene bio-based engineering raw rubber is obtained.

Further operations include taking 100 g dibutyl itaconate-butadiene bio-based engineering raw rubber mentioned above to mix with 5 g zinc oxide, 2 g stearic acid, 1 g sulphur, 0.7 g accelerator M, 1 g accelerator CZ, 40 g carbon black N330 homogeneously on two roll mill to get rubber compound. The mold cure is performed under 150° C. to get dibutyl itaconate-butadiene bio-based engineering rubber.

Comparison 1

Further operations include taking 100 g SBR1502 to mix with 5 g zinc oxide, 2 g stearic acid, 1 g sulphur, 0.7 g accelerator M, 1 g accelerator CZ, 60 g silica and 6 g Si69 homogeneously on two roll mill to get rubber compound, process mold cure under 150° C. to get silica-SBR composite.

Comparison 2

Further operations include taking 100 g nature rubber (Cloudmark 1 #) to mix with 5 g zinc oxide, 2 g stearic acid, 1 g sulphur, 0.7 g accelerator M, 1 g accelerator CZ, 60 g carbon black N330 homogeneously on two roll mill to get rubber compound. The mold cure is performed under 150° C. to get carbon black-nature rubber composite.

TABLE 1 testing results of raw rubber performance produced by the embodiments. Data in Table 1 was tested by the national standard test method.

| Embodiments | Temperature/° C. | number-average molecular weight | weight-average molecular weight | dispersancy index |
|---|---|---|---|---|
| 1 | 1 | 1310452 | 1862128 | 1.42 |
| 2 | 5 | 1422839 | 2602942 | 1.83 |
| 3 | 5 | 1379977 | 1935832 | 1.40 |
| 4 | 5 | 1270000 | 1860000 | 1.46 |
| 5 | 5 | 1128462 | 2491020 | 2.11 |
| 6 | 5 | 927846 | 2289472 | 2.07 |
| 7 | 10 | 840392 | 1634274 | 1.94 |
| 8 | 20 | 573466 | 1236894 | 2.16 |

As is shown in Table 1, itaconate-butadiene bio-based engineering raw rubber produced by the present disclosure has high molecular weight, narrow molecular weight distribution and polymerization is processing at low temperature, it lowers the energy consumption, and it is suitable for industrial manufacture.

TABLE 2 physical-mechanical properties and dynamic mechanical properties of rubber composite produced by embodiments and comparisons. Data in Table 2 were tested by the national standard test method.

| | Tensilestrength/ MPa | Breaking elongation/% | 300% stretching strength/ MPa | Shore A hardness | permanent deformation/% | tanδ 0° C. | tanδ 60° C. |
|---|---|---|---|---|---|---|---|
| Embodiment 1 | 13.4 | 385 | 10.8 | 71 | 20 | 0.18 | 0.13 |
| Embodiment 2 | 18.8 | 437 | 13.5 | 65 | 16 | 0.22 | 0.14 |
| Embodiment 3 | 21.2 | 510 | 11.1 | 61 | 16 | 0.25 | 0.13 |
| Embodiment 4 | 28.0 | 774 | 9.3 | 60 | 16 | 0.28 | 0.11 |
| Embodiment 5 | 25.5 | 598 | 10.8 | 61 | 14 | 0.27 | 0.11 |
| Embodiment 6 | 23.9 | 502 | 9.5 | 63 | 16 | 0.28 | 0.10 |
| Embodiment 7 | 20.8 | 473 | 8.9 | 60 | 16 | 0.23 | 0.13 |
| Embodiment 8 | 17.9 | 469 | 9.2 | 62 | 18 | 0.27 | 0.12 |

TABLE 2-continued physical-mechanical properties and dynamic mechanical properties of rubber
composite produced by embodiments and comparisons. Data in Table 2 were tested by the
national standard test method.

| | Tensilestrength/ MPa | Breaking elongation/% | 300% stretching strength/ MPa | Shore A hardness | permanent deformation/% | tanδ 0° C. | tanδ 60° C. |
|---|---|---|---|---|---|---|---|
| Comparison 1 | 21.3 | 438 | 8.4 | 78 | 16 | 0.17 | 0.13 |
| Comparison 2 | 24.7 | 547 | 11.7 | 65 | 14 | 0.15 | 0.12 |

As is shown in table 2, itaconate-butadiene bio-based engineering rubber produced by the present disclosure has outstanding physical-mechanical properties after reinforcing fillers, tensile strength and breaking elongation performance is reaching or exceeding traditional SBR and natural rubber, it satisfies the higher requirements for tire and conveyor. Moreover, at 0° C., tan δ of itaconate-butadiene bio-based engineering rubber produced by the present disclosure is much higher than SBR and natural rubber, at 60° C., tan δ of itaconate-butadiene bio-based engineering rubber produced by the present disclosure is equal to SBR and natural rubber or even lower than them. This indicates that itaconate-butadiene bio-based engineering rubber produced by the present disclosure has outstanding dynamic mechanics performance to make it suitable for producing low rolling resistance and high wet-skid resistance tire rubber material.

Embodiments 9-15

Itaconate-butadiene bio-based engineering rubber produced by embodiments 9-15, inventory of itaconate and butadiene is different, for another reagent, variety, and weight are the same as well as preparation technics. Inventory of itaconate and butadiene are shown in Table 3. Specific steps as follow.

Various operations were performed to add 500 g deionized water, dibutyl itaconate, 3 g soap of potassium aliphatate, 4 g soap of sodium aliphatate, 0.2 g $H_3PO_4$, 0.12 g KOH, 0.02 g EDTA, 0.25 g TAOM-L, 0.01 g EDTA-Fe and 0.05 g sodium formaldehyde sulfoxylate into a 1 L polymerization device; seal the device, vacuumize and fill with nitrogen, continuously operation for 5 times. Then, butadiene, 0.02 g sodium dithionite, and 0.03 g hydrogen peroxide p-menthane are added to the device, react 8 hours under 5° C., 1 Mpa, add 1 g hydroxylamine to end the reaction to obtain dibutyl itaconate-butadiene bio-based engineering rubber latex. It is poured into 1 wt % calcium chloride solution to finish emulsion breaking and drying process, then dibutyl itaconate-butadiene bio-based engineering raw rubber is obtained.

Further operations include taking 100 g dibutyl itaconate-butadiene bio-based engineering raw rubber mentioned above to mix with 5 g zinc oxide, 2 g stearic acid, 1 g sulphur, 0.7 g accelerator M, 1 g accelerator CZ, 60 g silica and 6 g Si69 homogeneously on two roll mill to get rubber compound. The mold cure is performed under 150° C. to get dibutyl itaconate-butadiene bio-based engineering rubber.

Comparison 3

Further operations include taking 100 g SBR2503 to mix with 5 g zinc oxide, 2 g stearic acid, 1 g sulphur, 0.7 g accelerator M, 1 g accelerator CZ, 60 g silica and 6 g Si69 homogeneously on two roll mill to get rubber compound, process mold cure under 150° C. to get silica-SBR composite.

Comparison 4

Further operations include taking 100 g nature rubber (lamination gum) to mix with 5 g zinc oxide, 2 g stearic acid, 1 g sulphur, 0.7 g accelerator M, 1 g accelerator CZ, 60 g carbon black N330 homogeneously on two roll mill to get rubber compound. The mold cure is performed under 150° C. to get carbon black-nature rubber composite.

TABLE 3 dynamic mechanic property of embodiments and comparisons
of the present disclosure. Data in Table 3 were tested
by the national standard test method.

| | Inventory of monobutyl itaconate/g | Inventory of butadiene/g | tanδ 0° C. | tanδ 60° C. |
|---|---|---|---|---|
| Embodiment 9 | 80 | 20 | 0.28 | 0.13 |
| Embodiment 10 | 70 | 30 | 0.28 | 0.12 |
| Embodiment 11 | 60 | 40 | 0.28 | 0.11 |
| Embodiment 12 | 50 | 50 | 0.23 | 0.11 |
| Embodiment 13 | 40 | 60 | 0.20 | 0.10 |
| Embodiment 14 | 30 | 70 | 0.15 | 0.09 |
| Embodiment 15 | 20 | 80 | 0.12 | 0.08 |
| Comparison 3 | — | — | 0.15 | 0.11 |
| Comparison 4 | — | — | 0.14 | 0.12 |

TABLE 4 physical-mechanical properties of rubber composite produced
by embodiments and comparisons. Data in Table 4 were
tested by the national standard test method.

| | Tensile strength/ MPa | Breaking elongation/% | 300% stretching strength/ MPa | Shore A hardness | permanent deformation/% |
|---|---|---|---|---|---|
| Embodiment 9 | 15.7 | 492 | 7.5 | 68 | 40 |
| Embodiment 10 | 17.4 | 509 | 8.8 | 68 | 32 |
| Embodiment 11 | 18.6 | 590 | 6.1 | 60 | 16 |
| Embodiment 12 | 21.2 | 640 | 6.4 | 65 | 16 |
| Embodiment 13 | 23.6 | 643 | 6.5 | 65 | 16 |
| Embodiment 14 | 25.0 | 774 | 4.3 | 71 | 16 |
| Embodiment 15 | 24.8 | 545 | 9.3 | 77 | 10 |
| Comparison 3 | 17.8 | 386 | 9.8 | 76 | 16 |
| Comparison 4 | 20.7 | 547 | 10.7 | 65 | 14 |

As is shown in Table 3 and 4, physical-mechanical properties and dynamic mechanical properties of dibutyl itaconate-butadiene bio-based engineering rubber produced by the present disclosure can be adjusted through controlling the inventory of dibutyl itaconate and butadiene. Dibutyl itaconate-butadiene bio-based engineering rubber produced by embodiments satisfies the higher requirements for tire and conveyor. Dibutyl itaconate-butadiene bio-based engineering rubber has the best dynamic mechanical properties when inventory ratio of dibutyl itaconate and butadiene is 60:40 (embodiment 11). At 0° C., tan δ of this kind of dibutyl itaconate-butadiene bio-based engineering rubber is much higher than SBR and natural rubber; at 60° C., tan δ of this kind of dibutyl itaconate-butadiene bio-based engineering rubber is equal to SBR and nature rubber. Embodiment 11 is suitable for producing low rolling resistance and high wet-skid resistance tire rubber material.

What is claimed is:

1. A method of preparing bio-based engineering rubber formed by emulsion polymerization of chemically cross-linked itaconate-butadiene copolymers, the method comprising:

A: performing the emulsion polymerization of itaconate and butadiene by:
mixing itaconate, emulsifier, electrolyte, activator and deionized water in a polymerization reactor,
closing the polymerization reactor,
removing air from the polymerization reactor using vacuum-pumping,
filling the polymerization reactor with nitrogen,
repeating mixing, closing, removing and filling operations for 1-5 times,
adding butadiene, deoxidant, and initiator to the polymerization reactor and performing reaction for 5-15 hours in the polymerization reactor under 1-20° C., 0.1-5 Mpa,
adding a terminator to terminate the reaction and performing demulsification and drying of the terminated reaction via an addition of a demulsifier to obtain a bio-based engineering elastomer raw glue comprising the itaconate-butadiene copolymers, wherein a mass ratio of the itaconate, the butadiene, the emulsifier, the electrolyte, the activator, the deoxidant and the initiator, the terminator and the deionized water is: 100: 1-100:1-10:0.1-5:0.01-5:0.1-5:0.01-5: 1-10:100-1000, a number average molecular weight of the itaconate-butadiene copolymers is about 53000-1640000, a weight-average molecular weight of the itaconate-butadiene copolymers is about 110000-2892000, and a molecular formula of itaconate is:

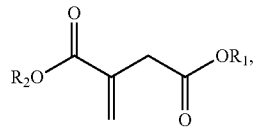

wherein $R_1$ and $R_2$ are H or $C_{1-10}$ alkyl, and $R_1$ $R_2$ are same or different; and B: performing vulcanization process based on the obtained bio-based engineering elastomer using sulfur as a cross-linking agent in a sulfur vulcanizing system under 140-160° C. to prepare the bio-based engineering rubber comprising the itaconate-butadiene copolymers.

2. The method of claim 1, wherein R1 and R2 are n-butyl, n-amyl or isoamyl.

3. The method of claim 1, wherein the emulsifier comprises at least one of disproportionate sodium abietate, disproportionated potassium rosinate, sodium aliphatate soap, potassium aliphatate soap, sodium dodecyl sulfate, sulfate sodium dodecyl benzene sulfonate, or sodium dodecyl sulfonate.

4. The method of claim 1, wherein the electrolyte comprises at least one of potassium chloride, potassium phosphate, ethylenediaminetetraacetic acid (EDTA), sodium m-dimethylnaphthalenesulfonate (TAOM-L), phosphate, or potassium hydroxide.

5. The method of claim 1, wherein the activator is a mixture of sodium formaldehyde sulfoxylate and ethylenediaminetetraacetic acid (EDTA) ferric or a mixture of sodium formaldehyde sulfoxylate and ferric sodium ethylenediaminetetraacetate (NaFeEDTA) and initiator mentioned above is p-Menthane Hydroperoxide, tert-butyl hydroperoxide or cumene hydroperoxide.

6. The method of claim 1, wherein the terminator is sodium N, N-dimethyl dithiocarbamate, sodium diethyldithiocarbamate, hydroxylamine or sodium polysulfide.

7. The method of claim 1, wherein the mass ratio of itaconate and butadiene monomer is 100:10 to 100:60.

8. The method of claim 1, wherein the sulfur vulcanizing system comprises vulcanization activator, vulcanization accelerator, and vulcanizator.

9. The method of claim 1, wherein the demulsifier comprises hydrochloric acid.

10. The method of claim 1, wherein the deoxidant comprises sodium hydrosulfite.

* * * * *